(12) United States Patent
Anderson

(10) Patent No.: US 6,766,073 B1
(45) Date of Patent: Jul. 20, 2004

(54) OPTICAL CIRCULATOR WITH LARGE NUMBER OF PORTS AND NO POLARIZATION-BASED COMPONENTS

(75) Inventor: Betty Lise Anderson, Gahanna, OH (US)

(73) Assignee: The Ohio State University, Columbus, OH (US)

( * ) Notice: Subject to any disclaimer, the term of this patent is extended or adjusted under 35 U.S.C. 154(b) by 157 days.

(21) Appl. No.: 10/150,791

(22) Filed: May 17, 2002

(51) Int. Cl.[7] ............................. G02B 6/42; G02B 6/32; G02B 6/34; G02B 5/08; G02B 5/10

(52) U.S. Cl. ............................. 385/18; 385/31; 385/33; 385/36; 359/850; 359/858

(58) Field of Search ............................. 359/290, 291, 359/298, 850, 851, 858; 385/17, 18, 24, 31, 33, 38, 39, 36, 46

(56) References Cited

U.S. PATENT DOCUMENTS

| | | |
|---|---|---|
| 4,225,938 A | 9/1980 | Turpin |
| 4,474,434 A | 10/1984 | Carlsen et al. |
| 4,474,435 A | 10/1984 | Carlsen et al. |
| 5,117,239 A | 5/1992 | Riza |
| 5,319,477 A | 6/1994 | DeJule et al. |
| 5,463,497 A | 10/1995 | Muraki et al. |
| 5,465,175 A | 11/1995 | Woodgate et al. |
| 5,936,759 A | 8/1999 | Buttner |
| 6,014,244 A | 1/2000 | Chang |
| 6,064,506 A | 5/2000 | Koops |
| 6,154,581 A | 11/2000 | Lu et al. .................. 385/11 |
| 6,188,817 B1 | 2/2001 | Goodfellow |
| 6,236,506 B1 | 5/2001 | Cao |
| 6,266,176 B1 | 7/2001 | Anderson et al. |
| 6,388,815 B1 | 5/2002 | Collins et al. |
| 6,542,657 B2 * | 4/2003 | Anderson .................. 385/18 |
| 6,614,954 B2 * | 9/2003 | Huang et al. .................. 385/18 |
| 2003/0118276 A1 * | 6/2003 | Frye et al. .................. 385/18 |

FOREIGN PATENT DOCUMENTS

JP     02002162574 A     6/2002

OTHER PUBLICATIONS

Hect, Jeff, Many Approaches Taken for All–Optical Switching, Laser Focus World, www.optoelectronics–world.com, Aug., 2001, 5 pp.

Fairley, Peter, The Microphotonics Revolution, Mit's Magazine of Innovation, Technology Review, Jul./Aug., 2000, pp. 38–44.

Zdeblick, Mark, Design Variables Prevent a Single Industry Standard, Laser Focus World, www.optoelectronics–world.com, Mar., 2001, pp. 139–144.

Bishop, David et al., The Rise of Optical Switching, Scientific American, Jan., 2001, 88–94.

* cited by examiner

Primary Examiner—Georgia Epps
Assistant Examiner—Jack Dinh
(74) Attorney, Agent, or Firm—Standley Law Group LLP

(57) ABSTRACT

An optical circulator of the present invention comprises (a) an array of ports, the array comprising at least a first port and a last port, each port is adapted to (i) inject a beam of light into said optical circulator, and (ii) remove a beam of light from said optical circulator; (b) a first reflective member adapted to receive a beam of light from a port and to reflect the beam of light to a second reflective member; (c) a second reflective member adapted to receive a beam of light from the first reflective member and to reflect the beam of light to a third reflective member; and (d) a third reflective member adapted to receive a beam of light from the second reflective member and to sequentially direct the beam to a next port of the array so as to circulate the beam of light through at least a portion of the array of ports.

16 Claims, 5 Drawing Sheets

OPTICAL CIRCULATOR WITH LARGE NUMBER OF PORTS AND NO POLARIZATION-BASED COMPONENTS

TECHNICAL FIELD OF THE INVENTION

This invention relates generally to optical devices and more particularly to an optical circulator.

BACKGROUND OF THE INVENTION AND SUMMARY OF THE INVENTION

An optical circulator of the present invention comprises: an array of ports, said array comprising at least a first port and a last port, each said port adapted to inject a beam of light into said optical circulator, each said port further adapted to remove a beam of light from said optical circulator; a first reflective member adapted to receive a beam of light from a port and to reflect said beam of light to a second reflective member; a second reflective member adapted to receive a beam of light from said first reflective member and to reflect said beam of light to a third reflective member; and a third reflective member adapted to receive a beam of light from said second reflective member and to sequentially direct said beam to a next port of said array so as to circulate said beam of light through at least a portion of said array of ports.

It is preferred that a beam of light from the last port is directed out of the optical circulator. It is most preferred that the beam of light from the last port may be directed to the first port.

While the first reflective member may be any appropriate reflective member, it is preferred that the first reflective member is a spherical mirror. Alternatively, the first reflective member may comprise a lens and a mirror, or a lens and a prism.

While the second reflective member may be any appropriate reflective member, it is preferred that the second reflective member is a mirror. It is preferred that the second reflective member comprises a flat mirror. Alternatively, the second reflective member may comprise a spherical mirror, a lens and a mirror, or a lens and a prism.

While the third reflective member may be any appropriate reflective member, it is preferred that the third reflective member is a spherical mirror. Alternatively, the third reflective member may comprise a lens and a mirror or a lens and a prism.

It is preferred that the optical circulator additionally comprises a fourth reflective member. The fourth reflective member is adapted to receive a beam of light reflected from the last port and is further adapted to reflect the beam of light to the first port. While the fourth reflective member may be any appropriate reflective member, it is preferred that the fourth reflective member is a spherical mirror. Alternatively, the fourth reflective member may comprise a lens and a mirror or a lens and a prism.

It is preferred that each port of the array of ports comprises an optic fiber. It is even more preferred that each optic fiber is in communication with at least one optical isolator.

DETAILED DESCRIPTION OF THE PREFERRED EMBODIMENT(S)

In accordance with the foregoing summary, the following presents a detailed description of the preferred embodiment(s) of the invention that is currently considered to be the best mode.

Consider a linear array of N fibers. We will take each fiber to be a port. Light may either come in or go out (or both) of any port at any given time. The objective of a circulator is to direct the light that comes into Port 1 such that it goes out Port 2. Light coming into Port 2, however, must not return to Port 1 but rather should go to Port 3. Light from Port 3 goes to Port 4, etc. Light from the $N^{th}$ (last) port can either go to a one-way port (in other words the last port is not used for input, only output), or the light that enters the last port can be directed back to Port 1 for a completely circular device.

Figure 1:
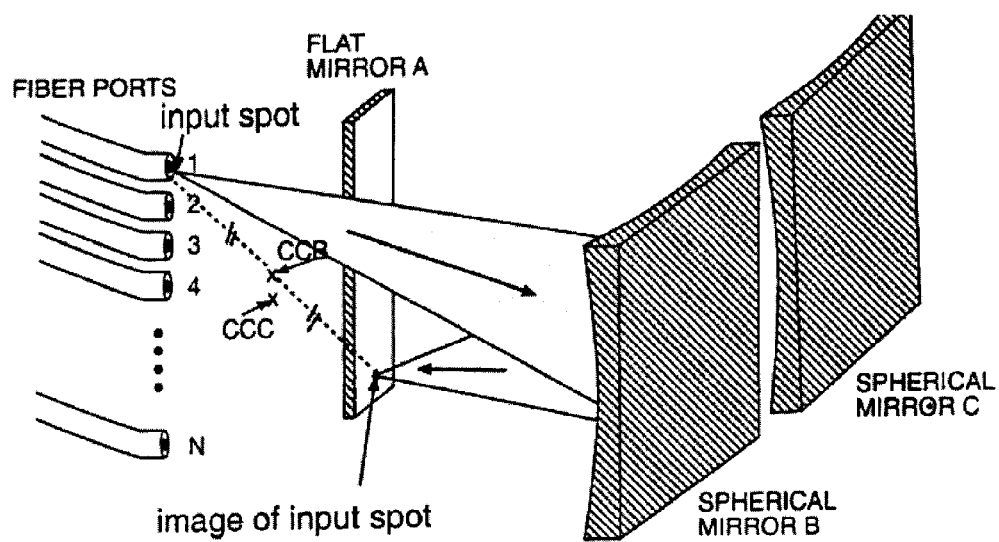
FIG. 1 illustrates the basic architecture of the optical circulator in accordance with one embodiment of the present invention.

In this invention, the light from each input is sent to the appropriate output using two spherical mirrors (or any appropriate optical substitution), as shown in FIG. 1(*a*). Here we see the array of fiber ports on the left. The light coming into the device emerges from Port 1. The beam will in general diverge, and is incident on Spherical Mirror B. Mirror B images the spot from Port 1 to a location on a flat mirror A to the right of the input array.

Let us assume for simplicity (although it is not required) that the flat mirror A is in the same plane as the fiber array (1:1 imaging). This implies $2f-2f$ imaging, meaning that the center of curvature of Mirror B (CCB) is on the plane of the fiber array and Mirror A. The image of light spot on the facet of Fiber 1 will appear on Mirror A an equal and opposite distance about the location of the center of curvature of Mirror B. Mirror A is positioned so as to direct the light to Mirror C.

Mirror C, which has the same focal length and radius of curvature as mirror B, will treat the image of the fiber facet on Mirror A as its object, and create a new image an equal and opposite distance from its center of curvature, CCC. To implement a circulator, the center of curvature of Mirror C is placed directly below the center of curvature of Mirror B, displaced by a distance equal to one half the pitch of the input fiber array. Thus the light from Port 1 is re-imaged on the fiber of Port 2.

Figure 2:
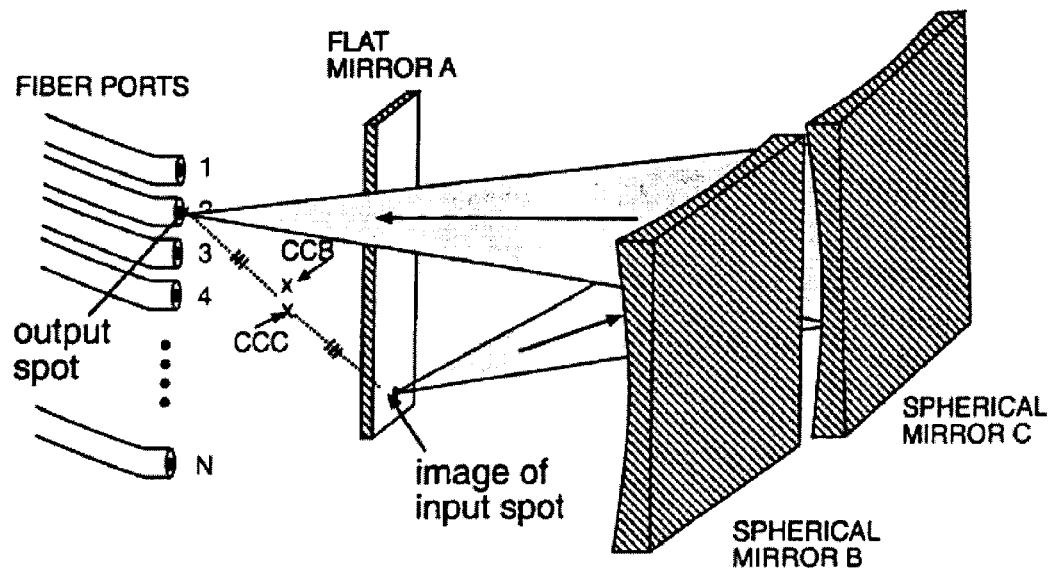
FIG. 2 illustrates the basic architecture of the optical circulator in accordance with one embodiment of the present invention.

FIG. 2 shows the spot pattern produced by each of ten inputs. The light coming out of each port is imaged onto Mirror A, and the re-imaged onto the next port down in the figure.

Figure 3:
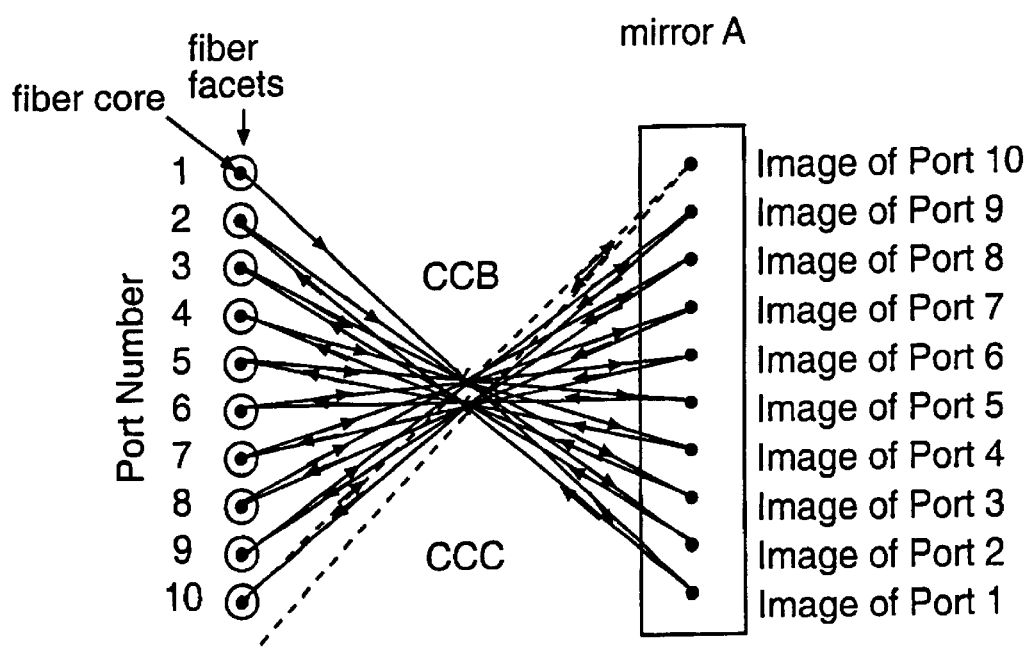
FIG. 3 illustrates the spot pattern produced by Mirrors B and C in accordance with one embodiment of the present invention.

The light entering Port 10 is lost in FIG. 2. This can be corrected, however, as shown in FIG. 3. Here Mirror A is modified. The top end, where the image of Port 10 lands, is angled differently. It sends the light from the image of Port 10 to a new spherical mirror D. This mirror is aligned with its center of curvature midway between the image of Port 10 and the actual Port 1. Thus the light from Port 10 goes to this special section of Mirror A, is sent to D, which re-mages the light onto Port 1. The circulator is complete.

Figure 4:
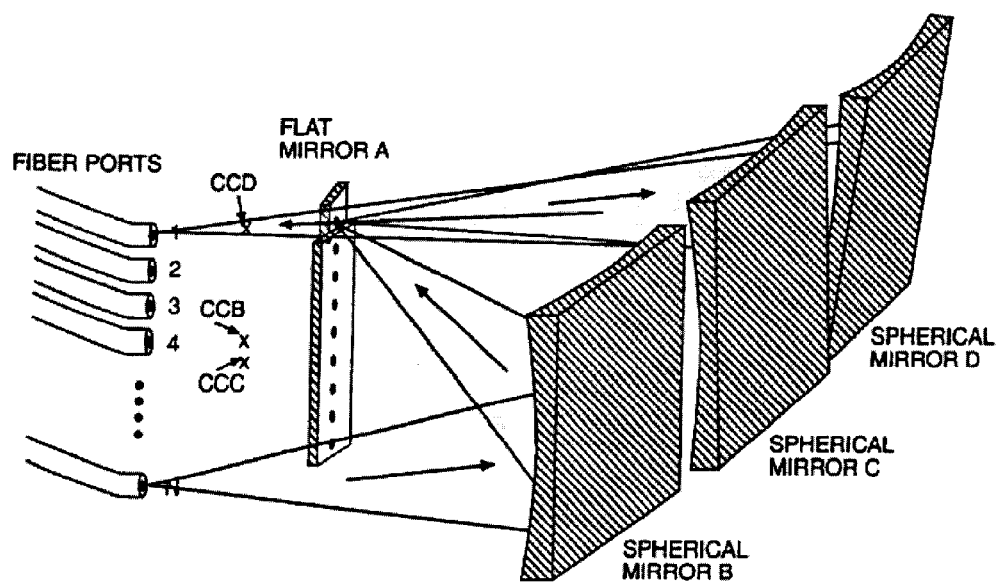
FIG. 4 shows how the optical circulator re-images the spot from the last port back onto the first port.
Figure 5:
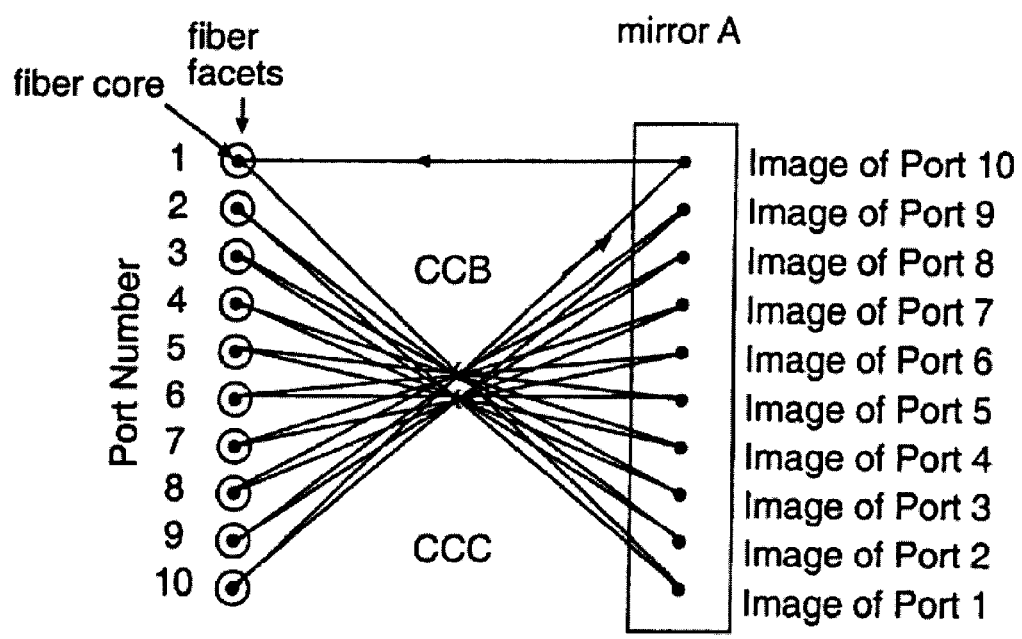
FIG. 5 shows the spot pattern for the complete circulator in accordance with one embodiment of the present invention.

The spot pattern for the complete circulator is shown in FIG. 4.

There is no particular limit to the number of inputs and outputs, which may number in the hundreds or thousands if appropriately sized mirrors are used.

Other circulators typically split each beam into its two polarizations, and manipulate the destination of each beam using waveplates, and rotators. The extinction is limited by the ability of the components to separate the polarization by the exactness of the relative delay in the birefringent waveplates (for example by the exactness of the thickness), and the exactness of angle of rotation implemented by the polarization rotators (again dependent on thickness). The current invention has no such polarization-manipulating components, and crosstalk is negligible.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

What is claimed is:

1. An optical circulator comprising:
   an array of ports, said array comprising at least a first port and a last port,
   each said port adapted to inject a beam of light into said optical circulator,
   each said port further adapted to remove a beam of light from said optical circulator;
   a first reflective member adapted to receive a beam of light from a port and to reflect said beam of light to a second reflective member;
   a second reflective member adapted to receive a beam of light from said first reflective member and to reflect said beam of light to a third reflective member; and
   a third reflective member adapted to receive a beam of light from said second reflective member and to sequentially direct said beam to a next port of said array so as to circulate said beam of light through at least a portion of said array of ports.

2. The optical circulator according to claim 1 wherein a beam of light from said last port is reflected out of said optical circulator.

3. The optical circulator according to claim 1 wherein a beam of light from said last port is reflected to said first port.

4. The optical circulator according to claim 1 wherein said first reflective member is a spherical mirror.

5. The optical circulator according to claim 1 wherein said first reflective member comprises a lens and a mirror.

6. The optical circulator according to claim 1 wherein said first reflective member comprises a lens and a prism.

7. The optical circulator according to claim 1 wherein said second reflective member is a mirror.

8. The optical circulator according to claim 1 wherein said third reflective member is a spherical mirror.

9. The optical circulator according to claim 1 wherein said third reflective member comprises a lens and a mirror.

10. The optical circulator according to claim 1 wherein said third reflective member comprises a lens and a prism.

11. The optical circulator according to claim 1 additionally comprising a fourth reflective member, said fourth reflective member adapted to receive a beam of light reflected from said last port and to reflect said beam of light to said first port.

12. The optical circulator according to claim 11 wherein said fourth reflective member comprises a spherical mirror.

13. The optical circulator according to claim 11 wherein said fourth reflective member comprises a lens and a mirror.

14. The optical circulator according to claim 11 wherein said fourth reflective member comprises a lens and a prism.

15. The optical circulator according to claim 1 wherein each said port of said array of ports comprises an optic fiber.

16. The optical circulator according to claim 15 wherein each said optic fiber is in communication with at least one optical isolator.

* * * * *